W. KNOBLOCK.
ELECTRIC STORAGE BATTERY.
APPLICATION FILED MAY 18, 1918.
1,297,185.
Patented Mar. 11, 1919.
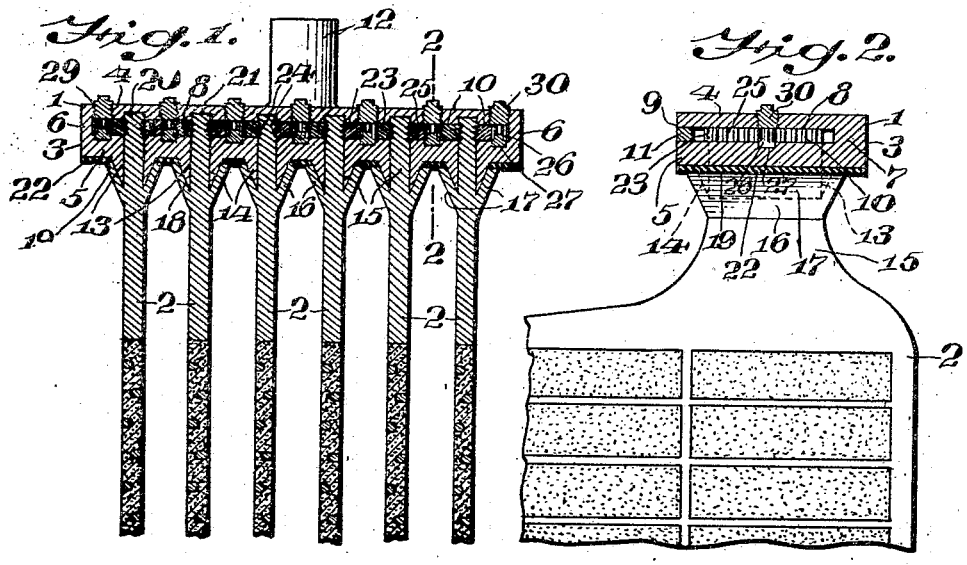
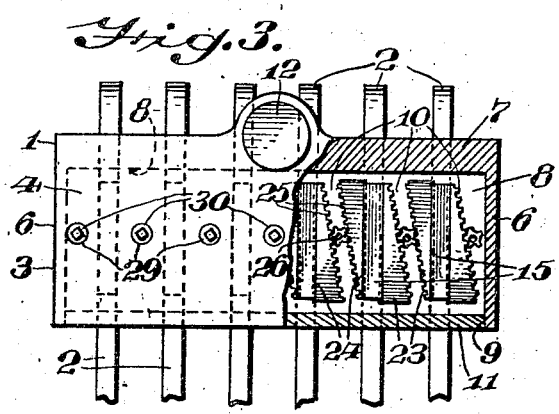
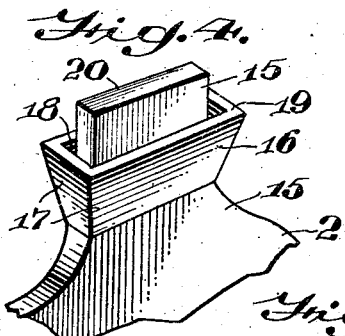
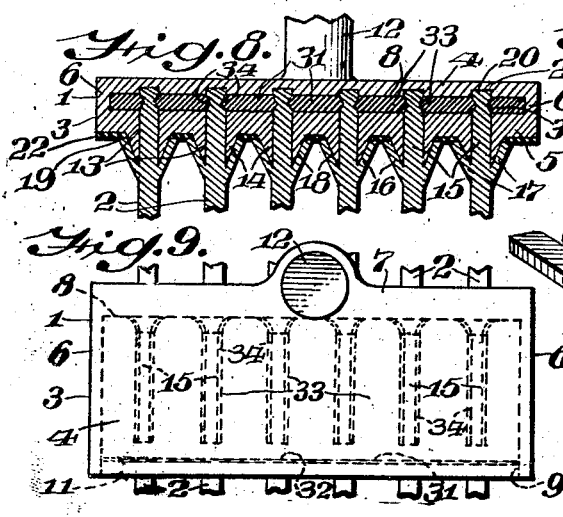
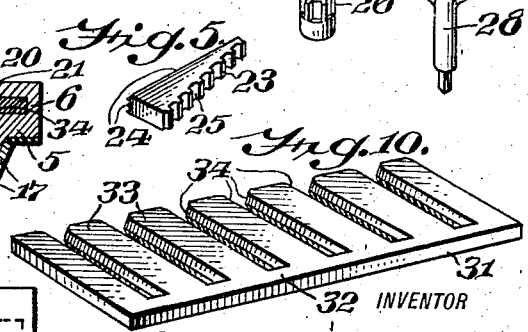
INVENTOR
William Knoblock.
BY
Wiedersheim + Fairbanks
ATTORNEYS

UNITED STATES PATENT OFFICE.

WILLIAM KNOBLOCK, OF PHILADELPHIA, PENNSYLVANIA, ASSIGNOR OF ONE-FOURTH TO CAROLA KNOBLOCK, ONE-THIRD TO WILLIAM J. GRAHAM, AND ONE-THIRD TO JOHN LAMON, ALL OF PHILADELPHIA, PENNSYLVANIA.

ELECTRIC STORAGE BATTERY.

1,297,185.  Specification of Letters Patent.  Patented Mar. 11, 1919.

Application filed May 18, 1918. Serial No. 235,225.

*To all whom it may concern:*

Be it known that I, WILLIAM KNOBLOCK, a citizen of the United States, residing in the city and county of Philadelphia, State of Pennsylvania, have invented a new and useful Electric Storage Battery, of which the following is a specification.

My invention comprehends a novel pillar strap for storage batteries, and novel means for connecting the electrodes to the pillar strap. Heretofore the electrodes of storage batteries have been connected to the pillar strap by lead burning which in many cases does not produce the proper contact between the electrodes and the pillar strap, thereby lessening the efficiency of the battery.

My novel pillar strap carries means under the control of the operator in the assembly of the electrodes to the pillar strap to insure at all times a perfect contact and thereby efficient conductivity of energy from the electrodes to the pillar strap.

Another object of my invention is to provide a novel construction of a pillar strap for electrodes whereby the electrodes are detachably connected to and adapted to be collectively supported from the pillar strap as a unit in the conductivity of the energy to the pillar strap as a common terminal.

Another object of my invention is to devise a novel pillar strap carrying clamping means adapted to be manually operated to detachably secure the electrodes to the pillar strap, the clamping means effecting a clear cut contact with the electrodes, together with means for sealing the clamping devices and contacting surfaces between the pillar strap and the electrodes against the action of the electrolyte.

Another object of my invention is to devise a novel pillar strap comprising a casing for inclosing the clamping means for connecting the electrodes to the pillar straps, the casing being provided with apertures and extensions adapted to coöperate with the electrode to rigidly hold the electrodes parallel with each other and vertical with respect to the pillar strap when assembled thereon.

I employ a novel construction of clamping devices, each of which is provided with a cutting edge, and means, manually operated, are employed to secure the electrodes to the pillar strap to cause such cutting edges to cut into the metal of the electrode to effect a clean and perfect contact between the clamping device and the lug of the electrode.

Other novel features of my invention will more clearly hereinafter appear in the detailed description.

The invention is satisfactorily illustrated in the accompanying drawing, but the important instrumentalities thereof may be varied, and so it is to be understood that the invention is not limited to the specific details shown and described, as long as they are within the spirit or scope of the claims.

Similar numerals of reference indicate corresponding parts in the figures.

Referring to the drawings.

Figure 1 represents a vertical sectional view of a pillar strap and its adjuncts embodying my invention.

Fig. 2 represents partly in elevation a section on line 2—2 of Fig. 1.

Fig. 3 represents a plan view of Fig. 1, partly broken away to show more clearly the manner of clamping the lugs of the electrodes to the pillar strap.

Fig. 4 represents a fragmentary perspective of the upper portion of an electrode showing more particularly the novel construction of the lug.

Fig. 5 represents a perspective view of a wedge clamp employed.

Fig. 6 represents a perspective view of one of the key pinions for operating the wedge clamps.

Fig. 7 represents a perspective view of the key for actuating the key pinions.

Fig. 8 represents a vertical sectional view of another embodiment of my invention.

Fig. 9 represents a plan view of Fig. 8.

Fig. 10 represents a perspective view of the locking device employed in Fig. 8 to bind the lugs of the electrodes to the pillar strap.

Referring now to Figs. 1, 2, 3, 4, 5, 6, and 7 of the drawings, 1 designates my novel pillar strap, 2 designates a plurality of electrodes adapted to be detachably and collectively connected with the pillar strap so that it forms a common terminal for all of the electrodes.

The pillar strap 1 comprises a casing 3 having top and bottom walls 4 and 5, end walls 6, and a rear wall 7, and a recess 8 having its front end 9 open for the reception of clamping devices 10 positioned within the recess 8.

11 designates a sealing strip preferably of lead for closing the open end of the chamber 8 after the clamping devices are positioned therein. The edge of the casing is pressed tightly against the sealing strip to seal the recess and the devices contained therein from the electrolyte.

The casing 6 has formed therewith a terminal post 12 for outside electrical connection.

The bottom wall 5 of the casing is provided with a plurality of apertures 13, extending through the tapered extension 14 integral with and converging downwardly from the under surface of the bottom wall 5.

15 designates an electrode lug, see Figs. 1 and 4, and this lug is of novel design to coöperate with the novel pillar strap 1. This lug 15 is provided with an apron 16 extending around the lug and comprising upwardly diverging walls 17 forming a tapered socket 18. The upper edge 19 of the walls 17 terminates below the upper end 20 of the lug 15. In the assembly of the electrodes 2 to the pillar strap 1, the lugs 15 are inserted into the apertures 13 and through the recess 8, the upper edge 20 of the lugs extending into the recess 21 formed in the inner surface of the top wall 4. The extension 14 engages in the socket 18, while between the upper edges 20 of the walls 17 and the under surface of the bottom wall 5 is placed a gasket 22 to prevent any leakage of the electrolyte into the casing 3. This assemblage of the electrodes to the pillar strap positions the electrodes parallel to each other and vertical with respect to the pillar strap. The clamping devices 10 for the lugs 16 consist of angular wedge bars 23 adapted to engage the opposite faces of that part of the lugs 16 which is positioned in the recess 8. The wedge bars are arranged in pairs between the lugs 15, and have their outer faces 24 provided with longitudinally extending cutting teeth adapted to cut into the faces of the lugs to provide a clean contact. The inner vertical toothed faces 25 of the wedges are disposed at an angle to the outer faces 24, and 26 designates a pinion seated in a socket 27 in the bottom wall 6 of the casing. The pinion 26 is provided with a polygonal shaped perforation to receive a key 28 for actuating the pinion to move the wedges in opposite directions to expand them and cause their outer faces to tightly wedge against and cut into the faces of the lugs to form a perfect electrical connection, and also serve as an effectual binding means between the pillar strap and the lugs of the electrodes to hold the electrodes to the pillar strap.

29 designates threaded openings in the top wall 4 of the casing. These casings permit a key to pass into a recess 8 to operate the pinion 26.

After the wedges have all been properly adjusted with respect to the lugs 15, threaded plugs 30 are screwed into the openings 29 to form a closure. The plugs 30 have any suitable formation to receive a working tool.

Referring now to Figs. 8, 9 and 10 of the drawings, another embodiment of my invention is shown in which the casing of the pillar strap and the lugs of the electrodes are similarly formed and loosely assembled together in the same manner as that shown in Figs. 1, 2, and 3. In this embodiment a single locking or binding member 31 is employed consisting of a bar 32 provided with a plurality of integral fingers 33 having obliquely beveled edges 34 at opposite sides. The binding member is inserted into the recess 8 to engage between and cut into the lugs 15 to collectively bind the lugs to the pillar strap. The binding member 31 is preferably composed of a harder material than the lugs 15 of the electrodes in order that the oblique bevel edges 34 will readily cut into the surface of the lugs to securely bind the lugs to the pillar strap and form a perfect contact between the electrodes and the pillar strap.

The open end of the recess 8 is effectively sealed by pressing the edges of the casing against the sealing strip 11 which corresponds in construction and arrangement to that seen in other figures of the drawing.

The electrodes 2 are connected to the pillar strap 1 which form a common terminal for all the electrodes by inserting the lugs 15 of the electrodes into the apertures 13 of the casing the upper portions 20 thereof engaging in the recesses 21 while the extension 14 on the under surface of the casing 3 engages in the socket 18 on the lugs, thus holding the electrodes parallel with each other and vertical with respect to the pillar strap.

The clamping devices 10 are then inserted in the recess 8 of the casing between that portion of the lugs 15 exposed in the recess. The sealing strip 11 is then placed in the front open end of the casing and pressure is applied to the edges of the casing surrounding the sealing strip to form a tight closure for the recess and the devices contained thereon. The electrodes 2 are now loosely assembled in the pillar strap, and the clamping devices 10 are in the casing. The operator manipulates the key 28 to turn the pinion 26 of each pair of clamping wedges to cause the cutting edges 24 of the wedges 23 to cut into the lugs 15 of the electrodes to form a clean cut contact surface between the clamping device.

In the embodiment seen in Figs. 8, 9 and 10, the clamping means for the electrodes consists of the single member 31 provided with integral fingers and adapted to be inserted into the recess 8 between the lugs 15 and pressed forwardly to cause the oblique cutting edges 34 of the fingers 33 to cut into the lugs of the electrodes after which the lead sealing strip 11 is inserted in the open end of the casing and sealed in the manner heretofore described.

The pillar strap and electrodes are preferably composed of lead, while the clamping devices are composed of harder metal, such as for example aluminum, it being understood however that they may be made of any suitable material.

Having thus described my invention what I claim as new and desire to secure by Letters Patent, is:—

1. The combination with a pillar strap casing consisting of a chambered casing having apertures in its bottom, of electrodes extending through said apertures and into said chamber, and locking members positioned between adjacent electrodes and of a material harder than that of said electrodes and arranged to cut said electrodes when moved to locked position.

2. The combination with a pillar strap casing having a chamber, of sealing means for said chamber, spaced electrodes extending into said chamber, and means to grip said electrodes to retain them in assembled position.

3. The combination with a piller strap casing having a chamber, of sealing means for said chamber, spaced electrodes extending into said chamber, wedges within said casing, and means to move said wedges to effect a lock between said casing and electrodes.

4. The combination with a pillar strap casing having a chamber, of sealing means for said chamber, spaced electrodes extending into said chamber, wedges within said casing and having a rack on one side, pinions engaging said rack to move said wedges into locking engagement with said casing, and means to actuate said pinions.

5. The combination with a pillar strap casing having a chamber, of sealing means for said chamber, spaced electrodes extending into said chamber, wedges within said casing and having a rack on one side, pinions engaging said rack to move said wedges into locking engagement with said casing, and a key to actuate said pinions.

6. The combination with a pillar strap casing having a chamber and provided with a single terminal, of electrodes extending into said chamber, wedges positioned on opposite sides of said electrodes within said chamber, and each being provided on one side with a rack, and on its opposite side with a cutting edge, pinions engaging juxtaposed racks, and means to actuate said pinions.

7. The combination with a pillar strap casing having a chamber and provided with a single terminal, of electrodes extending into said chamber, wedges positioned on opposite sides of said electrodes within said chamber, and each being provided on one side with a rack, and on its opposite side with a cutting edge, pinions engaging juxtaposed racks, said casing having apertures above said pinions to provide for the introductions of a working tool to actuate said pinions, and closures for said apertures.

8. The combination with a pillar strap casing having a chamber and provided with spaced apertures in its bottom and conical lugs surrounding said aperture, electrodes adapted to pass through said apertures and having a surrounding flange forming a seat for said lugs, and means within said casing to lock said electrodes with respect to it.

9. The combination with a pillar strap casing having a chamber open at one side, of electrodes extending into said chamber, and a locking member movable laterally into said chamber and provided with means to cut into said electrodes to retain said electrodes in position and form an electrical connection between said electrodes and said casing.

WILLIAM KNOBLOCK.

Witnesses:
JOHN A. WIEDERSHEIM,
N. BUSSINGER.